(12) United States Patent
Schaefer et al.

(10) Patent No.: US 9,228,868 B2
(45) Date of Patent: Jan. 5, 2016

(54) MAGNETICALLY INDUCTIVE FLOWMETER FOR DETERMINING THE FLOW RATE OF A FLUID FLOWING THROUGH A MEASURING TUBE

(71) Applicant: Sensus Spectrum LLC, Raleigh, NC (US)

(72) Inventors: Burghardt Schaefer, Mutterstadt (DE); Anh Tuan Chu, Ludwigshafen (DE); Roland Stripf, Sembach (DE)

(73) Assignee: Sensus Spectrum LLC, Raleigh, NC (US)

( * ) Notice: Subject to any disclaimer, the term of this patent is extended or adjusted under 35 U.S.C. 154(b) by 0 days.

(21) Appl. No.: 14/471,480

(22) Filed: Aug. 28, 2014

(65) Prior Publication Data
US 2015/0143918 A1 May 28, 2015

(30) Foreign Application Priority Data
Aug. 28, 2013 (DE) .......................... 10 2013 014 223

(51) Int. Cl.
*G01F 1/58* (2006.01)
(52) U.S. Cl.
CPC ...................... *G01F 1/584* (2013.01)
(58) Field of Classification Search
CPC ........................................................ G01F 1/58
USPC .............................. 73/861.12, 861.11, 861.13
See application file for complete search history.

(56) References Cited

U.S. PATENT DOCUMENTS

| | | | | |
|---|---|---|---|---|
| 5,773,723 A | * | 6/1998 | Lewis | G01F 1/58 138/133 |
| 6,843,136 B2 | | 1/2005 | Hofmann et al. | |
| 8,322,229 B2 | * | 12/2012 | Iijima | G01F 1/584 73/861.12 |
| 8,915,146 B2 | * | 12/2014 | Kerrom | G01F 1/584 73/861.12 |
| 2007/0039398 A1 | * | 2/2007 | Conrady | G01F 1/584 73/861.12 |
| 2007/0227248 A1 | | 10/2007 | Glauser | |

FOREIGN PATENT DOCUMENTS

| | | |
|---|---|---|
| DE | 1 773 773 | 9/1971 |
| DE | 29 50 039 | 7/1981 |
| DE | 197 22 977 C1 | 2/1999 |
| DE | 296 23 770 U1 | 8/1999 |
| DE | 102 40 024 B4 | 3/2004 |
| DE | 10 2012 002 202 A1 | 8/2013 |
| DE | 10 2012 109 312 A1 | 4/2014 |
| EP | 0 892 252 A1 | 1/1999 |
| WO | WO 85/04954 A1 | 11/1985 |
| WO | WO 98/55837 | 12/1998 |

* cited by examiner

*Primary Examiner* — Jewel V Thompson
(74) *Attorney, Agent, or Firm* — Muncy, Geissler, Olds & Lowe, P.C.

(57) ABSTRACT

A magnetically inductive flow meter unit for determining a flow rate of a fluid flowing through a measuring tube, having a measuring tube having a measuring channel and a measuring sensor, which is disposed in the measuring channel and is oriented in alignment with the wall of the measuring tube, the measuring sensor including an electrode head, which is made of an electrically conductive material and has a fluid contact section, the electrode head being in direct contact with the fluid flowing through the measuring tube by means of the fluid contact section, the electrode head having an indentation on the side facing the fluid, which forms at least part of the fluid contact section.

10 Claims, 5 Drawing Sheets

MAGNETICALLY INDUCTIVE FLOWMETER FOR DETERMINING THE FLOW RATE OF A FLUID FLOWING THROUGH A MEASURING TUBE

This nonprovisional application claims priority under 35 U.S.C. §119(a) to German Patent Application No. DE 10 2013 014 223. 7, which was filed in Germany on Aug. 28, 2013, and which is herein incorporated by reference.

BACKGROUND OF THE INVENTION

1. Field of the Invention

The present invention relates to a magnetically inductive flow meter unit for determining a flow rate of a fluid flowing through a measuring tube.

2. Description of the Background Art

Magnetically inductive flow meters are known and are based on the principle of separating charged, moving particles in a magnetic field. A magnetically inductive flow meter thus has a magnetic field perpendicular to the direction of flow of the fluid to be measured. The charged particles contained in the fluid are deflected and separated by the applied magnetic field perpendicularly to the magnetic field. A voltage induced by the separated, charged particles may be tapped with the aid of two measuring sensors disposed perpendicularly to the magnetic field. The tapped voltage is a measure of the flow rate.

A distinction is made between a galvanic and a capacitive signal tap. In measuring sensors for a galvanic signal tap, the electrode of the measuring sensor is in direct contact with the fluid. As a result thereof, the electrode is exposed to contamination and damage. For example, sand or rust particles contained in a fluid such as water may contaminate or damage the surface of the electrode.

For this reason, it is proposed in WO 85/04954 A1 to dispose a cap made of a porous, ceramic material, glass or a porous plastic on the surface of the measuring electrode, so that, while the fluid to be measured is able to penetrate all the way to the electrode, the particles contained in the fluid are held back by the cap.

Such measuring sensors having a cap on the surface of the electrode deliver imprecise, namely excessively low, measured values in a magnetically inductive flow meter, in particular at low flow rates to be measured. Thus, magnetically inductive flow meters having the aforementioned type of measuring sensors frequently do not display a flow rate of a fluid such as water, even though a low flow rate of the fluid is present. It has been furthermore established that the particles contained in the fluid produce a lot of noise on the electrode upon striking the electrode. The measuring signal at the electrode is thus significantly reduced by the upstream cap, which, in turn, results in a lower, i.e., poorer, signal-to-noise ratio.

SUMMARY OF THE INVENTION

It is therefore an object of the present invention to provide a generic, magnetically inductive flow meter unit for determining the flow rate of a fluid flowing through a measuring tube, in which the measuring signal has a high, i.e., good, signal-to-noise ratio, which has a long service life and which is cost-effective to manufacture.

The invention is based on the finding that an electrode, which is immersed in a conductive fluid forms a double charge layer or a Helmholtz layer on its surface. Electrons are deposited on the inside of the electrode in the area of surface of electrode and attracts cations from fluid to electrode to compensate for its charge, so that an electrical potential forms between electrode and fluid. Double charge layer thus acts as a capacitor, and double layer capacitance of the double charge layer influences the noise amplitude of the measuring signal at the electrode.

Magnetically inductive flow meters are usually operated in alternating magnetic field directions.

It has been established that enlarging a fluid contact section of a measuring sensor, i.e., an area in which a measuring sensor, in particular an electrode head, is in direct contact with the fluid, results in a reduction in the noise component, compared to conventional measuring sensors, and the signal-to-noise ratio may be increased in this manner. In other words, with the aid of this action, the measuring signals of a measuring sensor may be significantly increased, compared to the noise.

In an embodiment according to the invention, the electrode head of a measuring sensor in a generic magnetically inductive flow meter has an indentation on the side facing the fluid, and the inner wall of the indentation forms at least part of the fluid contact section. For example, the indentation is designed as a cavity-like indentation, such as a bore, in the electrode head.

In the approach according to the invention, the signal-to-noise ratio is thus improved, compared to known measuring sensors, since the fluid contact section is larger than in measuring sensors known up to now.

The approach according to the invention furthermore has the advantage that a large area of the fluid contact section, namely the area of the fluid contact section located inside the indentation, is in direct contact with the fluid but is not exposed to the flow of the fluid. The danger of damage to the fluid contact section by accelerated particles contained in the flow of the fluid is thus significantly reduced hereby, compared to measuring sensors known up to now. This not only results in a longer service life of the fluid contact section but also in a better signal-to-noise ratio, since fewer accelerated particles, which negatively influence the signal-to-noise ratio, strike the fluid contact section.

The approach according to the invention also has the advantage than an enlargement of the fluid contact section is obtained without changing the basic outer shape of the electrode head, so that the electrode head may be inserted into existing measuring systems.

In an embodiment, the electrode head has a base body and a plate-shaped terminating element, which is provided as a single piece with the base body and projects laterally over the base body, and the indentation is provided at least in the terminating element, the side of the terminating element facing the fluid and the indentation forming the fluid contact section. The fluid contact section is further enlarged hereby, whereby the signal-to-noise ratio is further improved.

In this embodiment, it is preferred that the measuring channel has a receiving section for the plate-shaped terminating element on the end facing the fluid.

It has been furthermore established that a polished surface of the fluid contact section results in a further improvement of the signal-to-noise ratio, since a more even double charge layer is formed on a polished surface than on a rough surface.

The fluid contact section can have a coating, at least in sections, to further protect the fluid contact section against the influences of particles, such as dirt particles, in the fluid.

The electrode head, which can be made of an electrically conductive material, is preferably manufactured from metal or graphite, it being further preferred that the electrode head is manufactured from a corrosion-resistant and/or a non-magnetizable steel, such as Hastelloy.

To avoid interfering flows with a measuring tube made of metal, it is advantageous for an electrically isolating material layer to be provided between the measuring sensor and the measuring channel.

The magnetically inductive flow meter unit can be operated by a battery.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
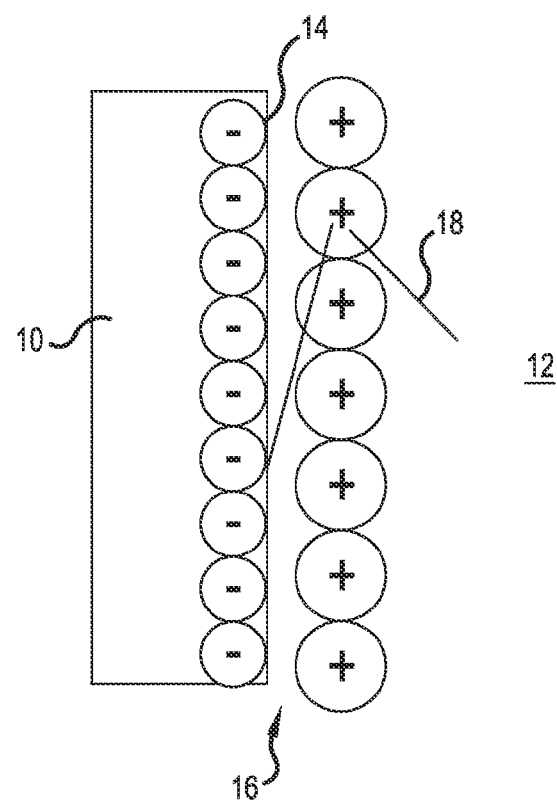
FIG. 1 shows the provision of a double charge layer on a surface of a measuring electrode.

FIG. 1 illustrates an electrode 10, which is immersed in a conductive fluid 12, forms a double charge layer or a Helmholtz layer 16 on its surface 14. Electrons are deposited on the inside of the electrode in the area of surface 14 of electrode 10 and attracts cations from fluid 12 to electrode 10 to compensate for its charge, so that an electrical potential 18 forms between electrode 10 and fluid 12. Double charge layer 16 thus acts as a capacitor, and double layer capacitance $C_s$ of the double charge layer influences the noise amplitude of the measuring signal at the electrode.

Figure 2:
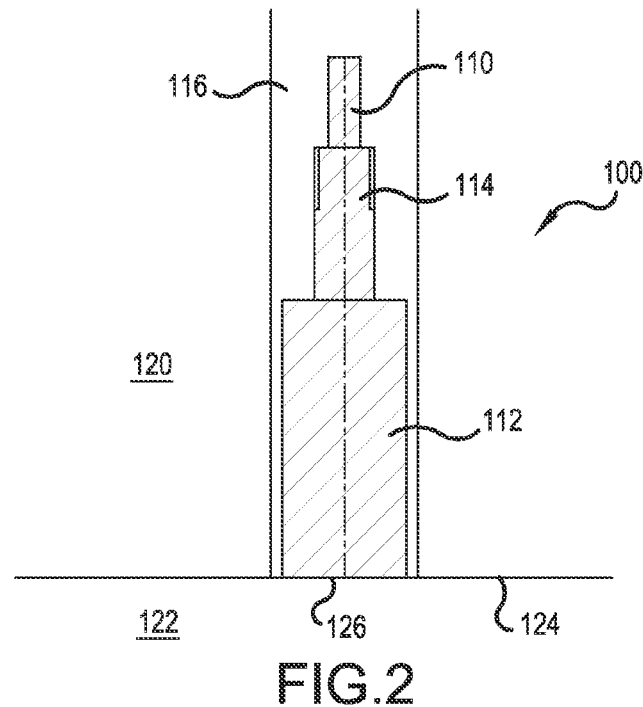
FIG. 2 shows a detail of a magnetically inductive flow meter having a measuring sensor according to the prior art.

FIG. 2 shows a detail of a magnetically inductive flow meter 100 having a measuring sensor 110 according to the prior art.

Measuring sensor 110 comprises an electrode head 112 having a solid base body in the form of a cylinder or a cuboid and a shaft 114, which is connected to a power cable, which is not illustrated. Both electrode head 112 and shaft 114 are made of an electrically conductive material such as steel. Measuring sensor 110 is disposed in a measuring channel 116, measuring channel 116, in turn, being provided in a wall section 120 of a measuring tube 122.

Measuring sensor 110 is oriented in alignment with wall surface 124 of measuring tube 122 in measuring channel 116. In other words, measuring sensor 110 is embedded into measuring channel 116 in such a way that electrode head 112 forms an even, in the sense of edge-free, surface with wall surface 124 of measuring tube 122 and does not project into measuring tube 122.

A fluid contact section 126, on which electrode head 112 is in direct contact with the fluid flowing through measuring tube 122, is provided on the front of electrode head 112.

A sealing element is provided at least between electrode head 112 and wall section 120 to prevent the fluid to be measured from entering measuring channel 116. Measuring sensor 110 is usually injected into measuring channel 116.

Figure 3:
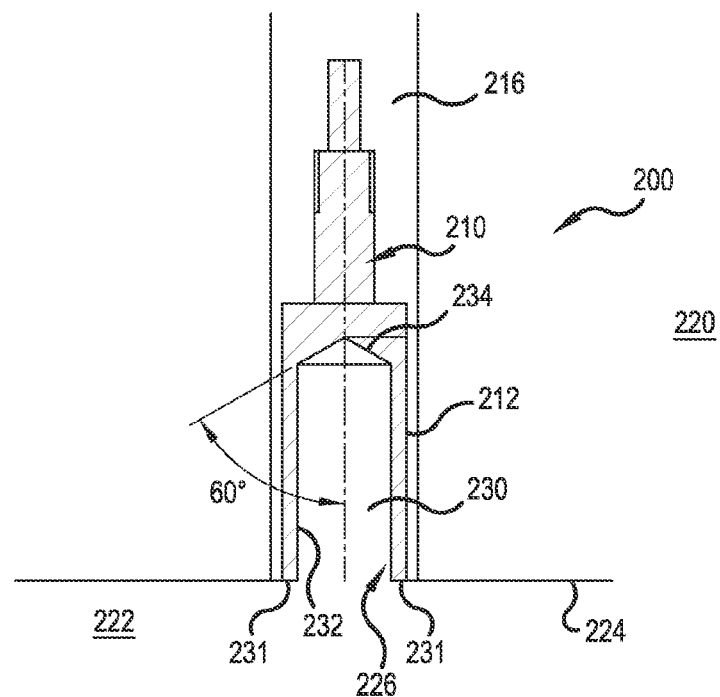
FIG. 3 shows a detail of a magnetically inductive flow meter having a measuring sensor according to a first preferred specific embodiment.

FIG. 3 shows a sectional view of a detail of a magnetically inductive flow meter 200 for measuring the flow rate of a fluid in a measuring tube 222, comprising a measuring sensor 210, according to a first preferred specific embodiment, in which fluid contact section 226 between electrode head 212 and the fluid is elevated, compared to the specific embodiment illustrated in FIG. 2.

Measuring sensor 210 is accommodated in a measuring channel 216 and oriented in alignment with wall surface 224 of measuring tube 222 in measuring channel 216, electrode head 212 including a cylindrical or cuboid base body having a cavity-like indentation in the form of a cylindrical bore 230, and side 231 of the electrode head facing the fluid forming an essentially even, in the sense of edge-free, surface with wall surface 224 of measuring tube 222.

A sealing material is provided between electrode head 212 and wall section 220 to prevent the fluid from flowing into measuring channel 216.

Fluid contact section 226 includes side 231 of electrode head facing the fluid and inner walls 232 of bore 230. The surface of fluid contact section 226 is significantly elevated with respect to the cross sectional surface of the cylindrical or cuboid base body of electrode head 212.

In this case, a cross sectional surface is understood to be the surface perpendicularly to the longitudinal axis of the measuring sensor.

The surface of fluid contact section 226 is preferably at least twice the size of the cross sectional surface of the base body of electrode head 212, particularly preferably at least five times the size of the cross sectional surface of the base body of electrode head 212 and in particular at least ten times the size of the cross sectional surface of the base body of electrode head 212.

In the interior of bore 230, a bore tip 234 is provided opposite the opening of bore 230.

In an embodiment, which is not illustrated, the bore tip can be omitted.

Figure 4:
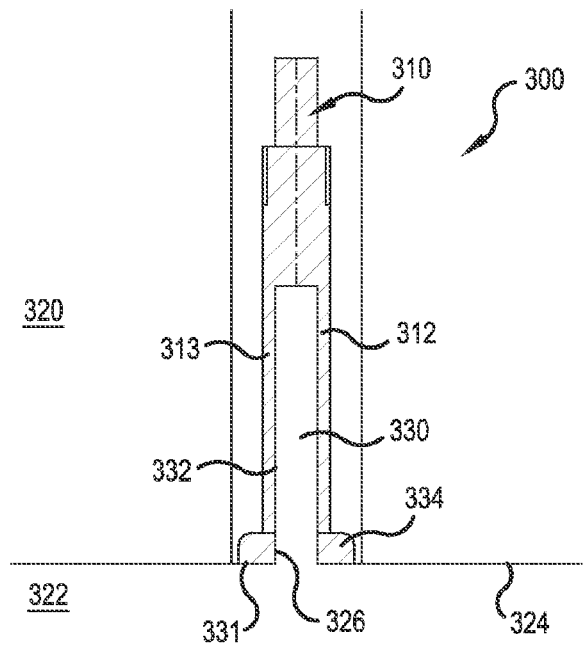
FIG. 4 shows a detail of a magnetically inductive flow meter having a measuring sensor according to a second preferred specific embodiment.

In a second specific embodiment of a magnetically inductive flow meter 300 comprising a measuring sensor 310, as illustrated in FIG. 4, electrode head 312 has a cylindrical or a cuboid base body 313, on which a plate-shaped terminating element 334 is disposed on its outer end.

Terminating element 334 is formed as a single piece on base body 313 and projects laterally over base body 313. Terminating element 334 is made of the same material as base body 313.

Side 331 of terminating element 334 facing the fluid is oriented in alignment with wall surface 324 of measuring tube 322, i.e., side 331 of terminating element 334 facing the fluid forms an essentially even, in the sense of edge-free, surface with wall surface 324 of measuring tube 322.

A bore 330 is provided in electrode head 312, which projects through terminating element 334 into base body 313 of the electrode head, the opening of bore 330 facing measuring tube 322.

Fluid contact section 326 is formed by side 331 of terminating element 334 facing the fluid and inner walls 332 of bore 330 and has a significantly higher value compared to the cross sectional surface of base body 313 or terminating element 334.

The surface of fluid contact section 326 is preferably at least twice the size of the cross sectional surface of the base body of electrode head 312, particularly preferably at least five times the size of the cross sectional surface of the base body of electrode head 312 and in particular at least ten times the size of the cross sectional surface of the base body of electrode head 312.

To accommodate terminating element 334 of electrode head 312 in wall section 320 of measuring tube 322, measuring channel 316 has a diameter which at least equals the diameter of terminating element 334. The term diameter in this case is not limited to round cross sections but also includes polygonal cross sections.

Figure 5:
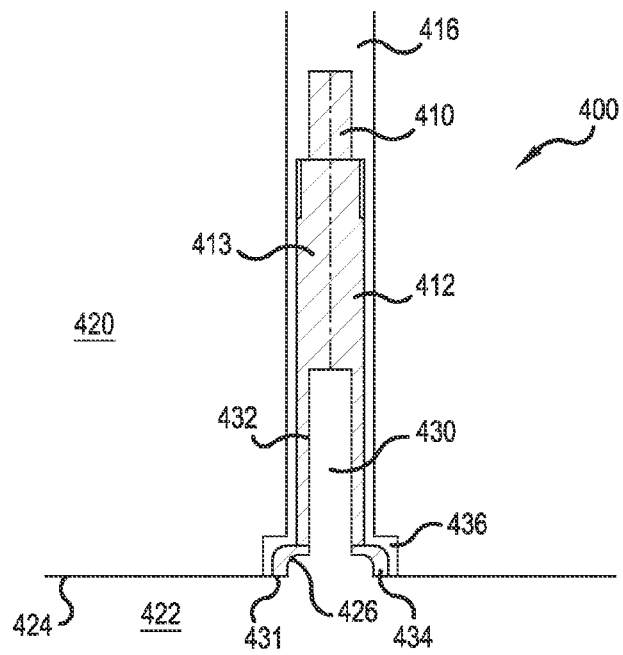
FIG. 5 shows a detail of a magnetically inductive flow meter having a measuring sensor according to a third preferred specific embodiment.

A third embodiment of a magnetically inductive flow meter 400 illustrated in FIG. 5 differs from the magnetically inductive flow meter illustrated in FIG. 4 in that the diameter of measuring channel 416 is designed to be smaller than the diameter of terminating element 434. To accommodate terminating element 434 in measuring channel 416, a receiving section in the form of a recess 436 is provided in wall section 420 of measuring tube 422. Base body 413 of electrode head 412 is disposed in measuring channel 416, and terminating element 434 of electrode head 412 is oriented in alignment with wall surface 424 of measuring tube 422 in recess 436.

Instead of a cylindrical bore, an indentation 430 having a variable cross section is provided in the third specific embodiment of the magnetically inductive flow meter, the cross section decreasing from the opening of indentation 430 in the direction of the interior of electrode head 412.

Side 431 of terminating element 434 facing the fluid forms fluid contact section 426, together with inner wall 432 of indentation 430.

Figure 6:
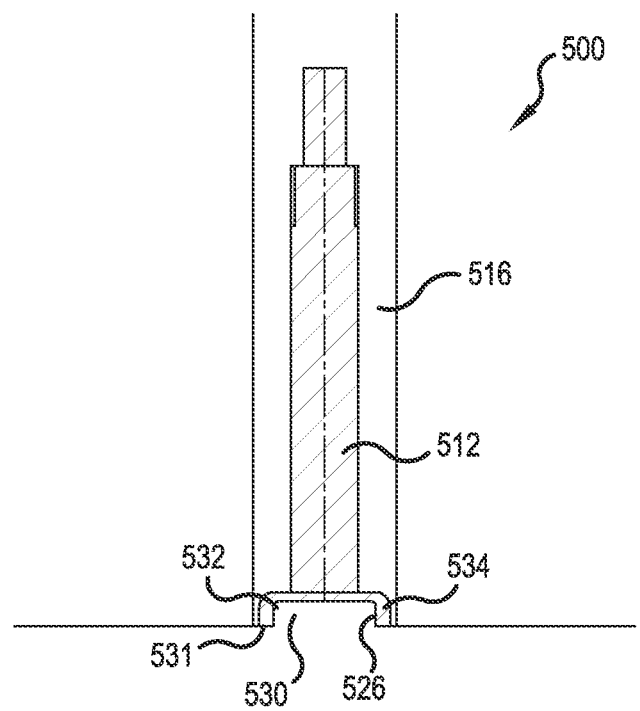
FIG. 6 shows a detail of a magnetically inductive flow meter having a measuring sensor according to a fourth preferred specific embodiment.

FIG. 6 shows a fourth specific embodiment of a magnetically inductive flow meter 500, in which indentation 530 is provided only in terminating element 534 of electrode head 512. Fluid contact section 526 is formed by side 531 of terminating element 534 facing the fluid and inner surface 532 of indentation 530.

Measuring channel 516 has a larger diameter than terminating element 534.

If measuring electrodes 312, 512 are also disposed in a measuring channel 316, 516 whose diameter is larger than that of terminating element 334, 534, measuring electrodes 312, 512 may also be disposed in a measuring channel having a receiving section, similarly to FIG. 5. Conversely, measuring sensor 400 illustrated in FIG. 5 may also be disposed in a measuring channel whose diameter is larger than that of terminating element 434.

It should be noted that the indentation in the electrode head does not have to have the illustrated shapes but may take on any shape which is suitable for enlarging the fluid contact section compared to the cross section of the base body of the electrode head or the terminating element.

The surface of the fluid contact section is preferably polished. The signal-to-noise ratio may be further improved hereby, compared to a rough surface of the fluid contact section.

Additionally or alternatively, the surface of the electrode head in the area of the fluid contact section may be coated, i.e., provided with a coating, at least in sections.

The electrode head is preferably made of a corrosion-resistant and/or non-magnetizable metal or of graphite. The use of Hastelloy is particularly preferred.

As mentioned above, measuring sensors 110, 210, 310, 410 and 510 are inserted fluid-tight into measuring channels 116, 216, 316, 416 and 516.

In the illustrated specific embodiments, measuring sensors 110, 210, 310, 410 and 510 are accommodated in a plastic casing or injected into the measuring channel.

Alternatively, the electrode heads may be fitted fluid-tight into the measuring channel. If the measuring tube in this case also has a wall made of a conductive material, an electrically isolating material layer is preferably applied to the inner wall of the measuring channel or to the outside of the measuring sensor.

Figure 7:
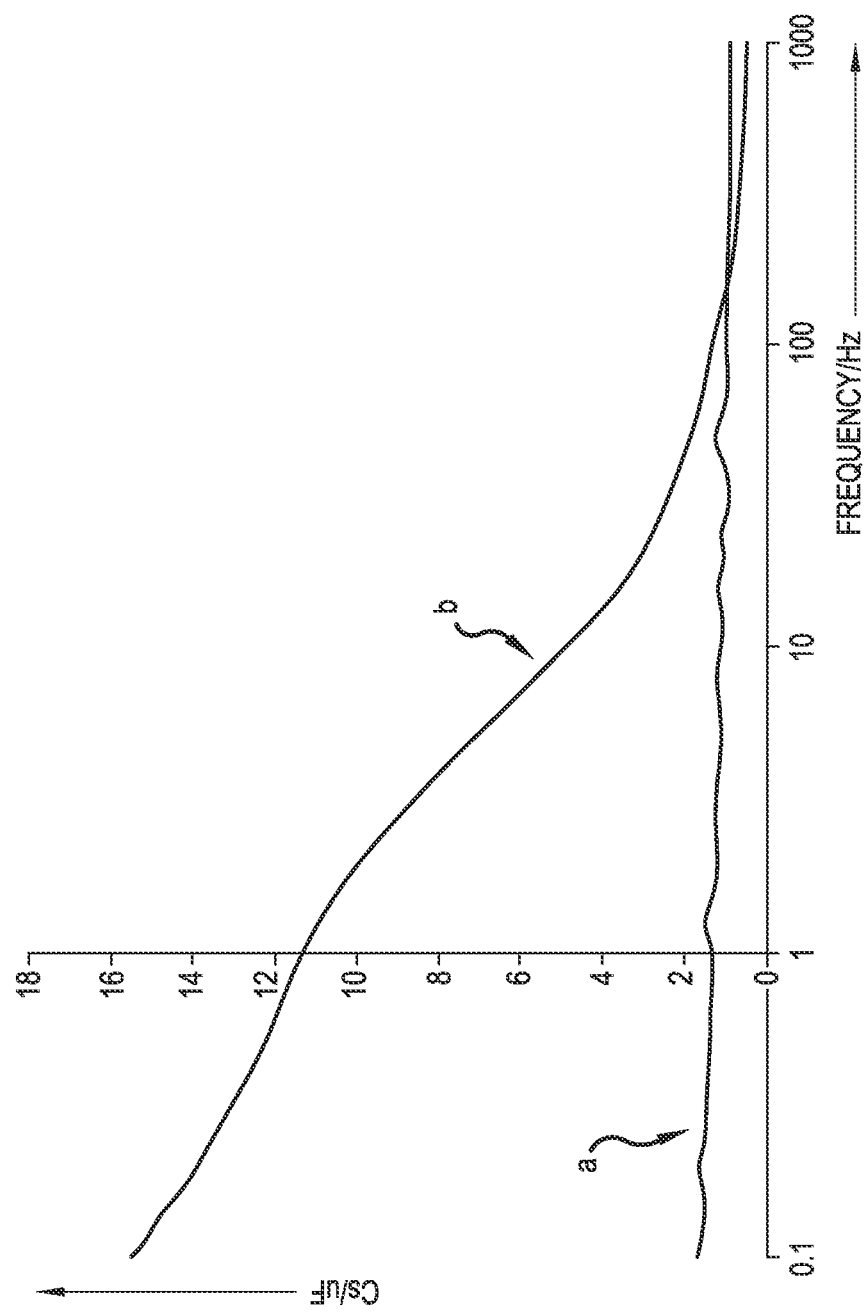
FIG. 7 shows double layer capacitance $C_s$ of a conventional measuring sensor and a measuring sensor having an enlarged fluid contact section.

FIG. 7 shows double layer capacitance $C_s$ as a function of the frequency of the applied alternating electric field. Curve a shows the measured values of double layer capacitance $C_s$ of a conventional measuring sensor, as illustrated in FIG. 2. The measured values of double layer capacitance $C_s$ of a measuring sensor having an enlarged fluid contact section are illustrated in curve b. As is clearly apparent, double layer capacitance $C_s$ in a measuring sensor having an enlarged fluid contact section is higher than in conventional measuring sensors, in particular at low frequencies. The signal-to-noise ratio of the measured values in a measuring sensor having an enlarged fluid contact section is significantly better than in a conventional measuring sensor, in particular at low frequencies.

Illustrated magnetically inductive flow meters 100, 200, 300, 400 and 500 are operable with the aid of a battery.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetically inductive flow meter unit for determining a flow rate of a fluid flowing through a measuring tube, the flow meter comprising:
    a measuring tube that has a measuring channel;
    a measuring sensor arranged in the measuring channel and is oriented in alignment with an inner surface of a wall of the measuring tube;
    an electrode head made of an electrically conductive material and having a fluid contact section, the electrode head being in direct contact with the fluid flowing through the measuring tube via the fluid contact section; and
    an indentation formed on a side of the electrode head facing the fluid, which forms at least part of the fluid contact section.

2. The magnetically inductive flow meter unit according to claim 1, wherein the indentation a cavity-like indentation or a bore in the electrode head.

3. The magnetically inductive flow meter unit according to claim 1, wherein the electrode head has a base body and a plate-shaped terminating element, which is provided as a single piece with the base body and projects laterally over the base body, and wherein the indentation is provided at least in a terminating element, a side of the terminating element facing the fluid and the indentation forming the fluid contact section.

4. The magnetically inductive flow meter unit according to claim 3, wherein the measuring channel has a receiving section for the plate-shaped terminating element on the end facing the fluid.

5. The magnetically inductive flow meter unit according to claim 1, wherein the fluid contact section has a polished surface at least in sections.

6. The magnetically inductive flow meter unit according to claim 1, wherein the fluid contact section has a coating at least in sections.

7. The magnetically inductive flow meter unit according to claim 1, wherein the electrode head is manufactured from metal or graphite.

8. The magnetically inductive flow meter unit according to claim 1, wherein the electrode head is manufactured from a corrosion-resistant and/or a non-magnetizable steel, in particular from Hastelloy.

9. The magnetically inductive flow meter unit according to claim 1, wherein an electrically isolating material layer is provided between the measuring sensor and the measuring channel.

10. The magnetically inductive flow meter unit according to claim 1, wherein a battery is provided for supplying power to the magnetically inductive flow meter unit.

* * * * *